No. 875,463. PATENTED DEC. 31, 1907.
C. SCHMITTHENNER.
SPEED REGULATOR.
APPLICATION FILED MAY 7, 1907.
2 SHEETS—SHEET 1.
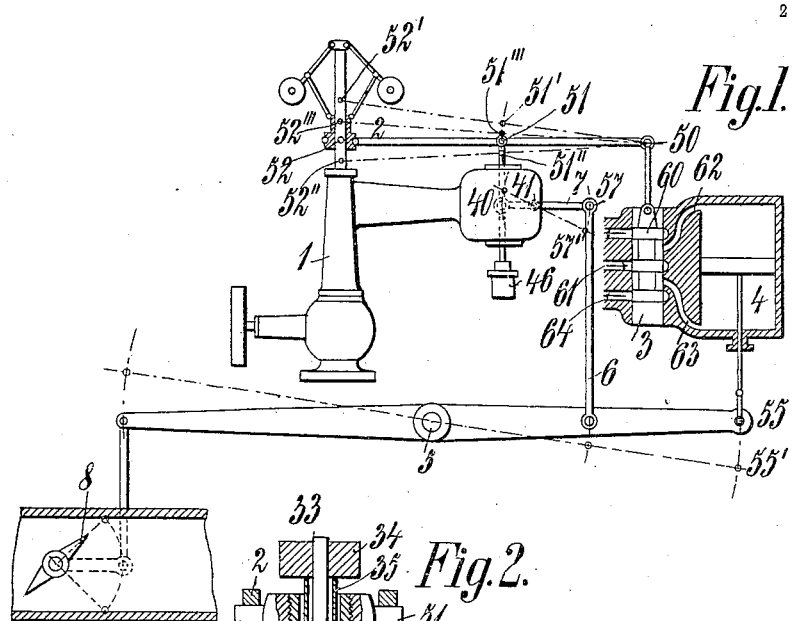
Fig.1.
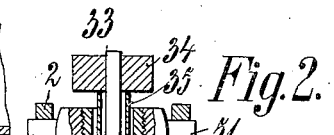
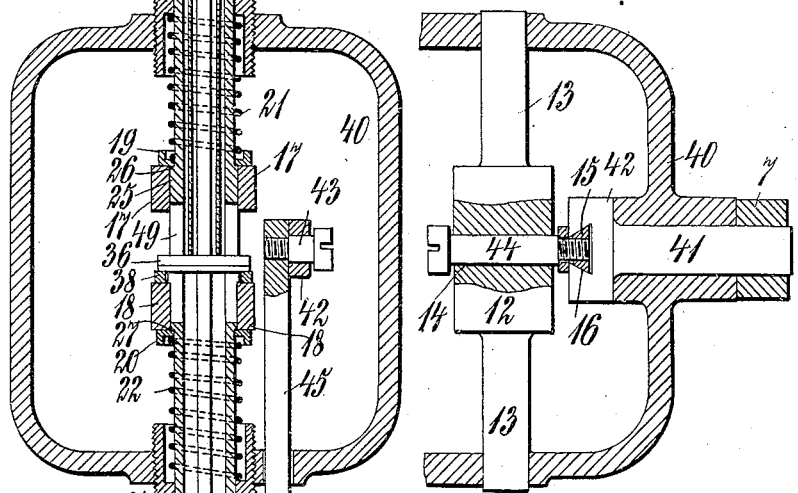
Fig.2.
Fig.5.
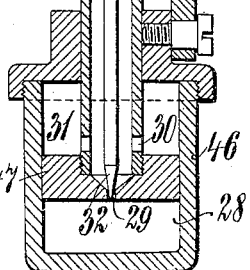
Fig.6.
WITNESSES
L. H. Grote
James B. Sanford
INVENTOR
Carlos Schmitthenner
By Howson and Howson
Attorneys No. 875,463. PATENTED DEC. 31, 1907.
C. SCHMITTHENNER.
SPEED REGULATOR.
APPLICATION FILED MAY 7, 1907.

2 SHEETS—SHEET 2.

WITNESSES
L. H. Grote
James B. Sangford

INVENTOR
Carlos Schmitthenner
By Howson and Howson
Attorneys

UNITED STATES PATENT OFFICE.

CARLOS SCHMITTHENNER, OF HEIDENHEIM-ON-THE-BRENZ, GERMANY.

SPEED-REGULATOR.

No. 875,463.      Specification of Letters Patent.      Patented Dec. 31, 1907.

Application filed May 7, 1907. Serial No. 372,314.

*To all whom it may concern:*

Be it known that I, CARLOS SCHMITTHEN-NER, a subject of the King of Würtemberg, and a resident of 23 Karlstrasse, Heidenheim-on-the-Brenz, Germany, have invented new and useful Improvements in Centrifugal Speed-Regulators of the Motor-Operated Type, and Particularly in the Return Mechanism for the Motor-Valve, of which the following is a specification.

In all centrifugal regulators the number of revolutions increases on a decrease of the load under which the regulated motor works. This difference in speed may be conveniently termed the normal degree of variation. By the use of known regulators in which spring or equivalent yielding means are employed in the return mechanism for the regulator motor-valve, this variation may be minimized and even eliminated. It is desirable however in electric motors to have an increase of speed on an increase of the working load for the regulated motor. Such an increase in speed may be conveniently termed the reverse degree of variation.

My present invention has for its object to provide a regulator which may be adjusted to give automatically the normal variation in the speed of the motor regulated, no variation whatsoever, or the reverse degree of variation as desired. In addition my invention comprises an improvement in regulators of the type above described, *per se*.

Figure 3:
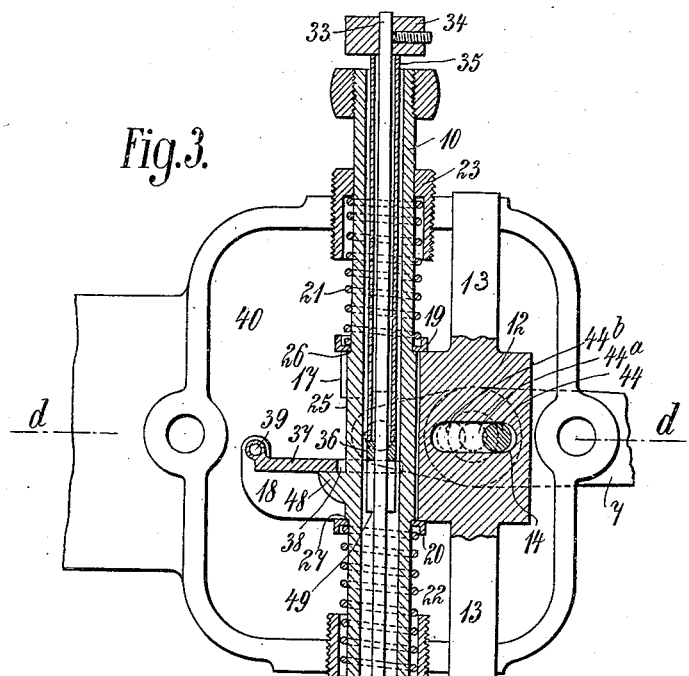

My invention may be understood by reference to the accompanying drawings in which Figure 1 is a diagrammatic representation of an ordinary hydraulic regulator; Figs. 2, 3 and 5 are vertical sections of my improved liquid brake and its operating mechanism, taken on the lines *a—a*, *c—c* and *b—b*, respectively in Fig. 4 which is a transverse section on the line *d—d*, Fig. 3, and Fig. 6 is a plan of the crank 42 of the mechanism.

The relation of my invention to the regulator may be seen from Fig. 1 in which is shown the centrifugal ball mechanism 1 which takes its speed from some portion of the regulated motor (not shown); the regulator lever 2; the slide valve 3 of the regulator motor 4, and the shaft 5 connected to the latter and operating the power supply valve (indicated by the reference numeral 8) of the motor regulated. The rod 6 and lever 7 form part of and control the motor-valve return mechanism which operates the valve through the regulator lever 2 to which it is secured at the pivoting point 51.

My invention is confined to the construction and action of the liquid brake 46 and its controlling means.

Figure 4:
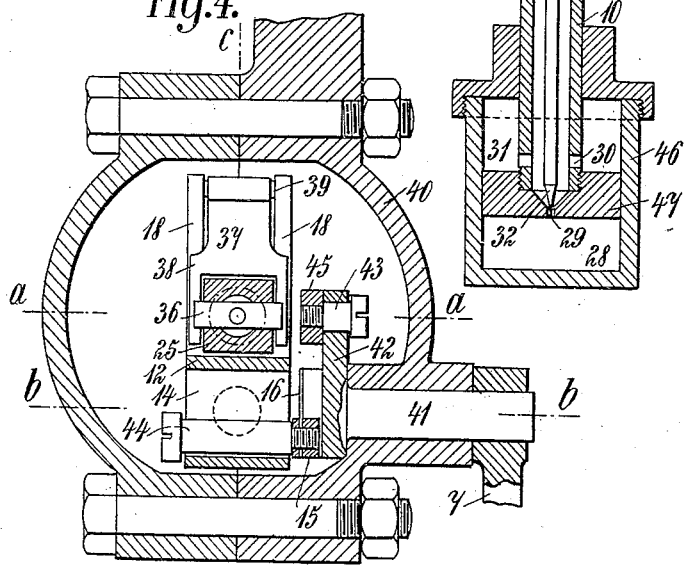

As may be seen in Fig. 4 I key the valve return lever 7 upon a rock shaft 41 which extends through bearings in the walls of the stationary chamber 40 into the interior of the chamber. On the inner end of the shaft 41 I mount a crank 42 (Fig. 6) provided with two crank pins 43 and 44. Secured by the pin 43 is a rod 45 which passes through the lower wall of the chamber 40 and is attached to the cylinder 46 of my liquid brake. It is thus seen that the cylinder of the brake is subjected, through these connections, to the movement of the lever 7 of the valve return mechanism.

In the cylinder 46 of the liquid brake works a piston 47 (Fig. 2) carried by a hollow piston rod 10 which extends upwards through bearings in the bottom and top of the chamber 40, and carries at its upper end a traverse with trunnions 51 on which the regulator lever 2 is fulcrumed (Fig. 1). The lever 2 is thus subject to the movement of the piston 47. Therefore so long as the oil of the liquid brake is confined in the space 28 beneath the piston, the brake is locked and the piston and cylinder move as one piece. The cylinder being connected through the rod 45, the crank 42 and the shaft 41 to the lever 7, the valve return mechanism will act exactly like that of the usual hydraulic regulator.

To one side of, but adjacent to, the piston rod 10 I provide a stop block 12 with vertical arms 13 which lie in a plane parallel to that of the piston rod and also pass through bearings in the top and bottom walls of the chamber 40. A horizontal slit 14 (Fig. 4) in this block 12 permits the passage therethrough of the crank pin 44. This pin is secured to the crank 42 by a dove-tailed nut 15 (Fig. 5) which is adjustable across a longitudinal dove-tailed groove 16 in the crank. This groove extends, it will be noted (Fig. 4) on both sides of the axis of the shaft 41 to which the crank 42 is secured. By this means it is possible to adjust the crank pin 44 to either side of the axis of the shaft 41 and thus to give it, and of course with it the block 12 through the horizontal slit in which the pin 44 extends, either an upward or a downward movement, on the revolution of the shaft 41 in a given direction. It is also possible to adjust the pin exactly in the axis of the shaft 41, with the result that the pin 44 merely revolves in the slot 14 without having any vertical motion whatsoever in either direction, on the revolution of the shaft 41. In connection with this block 12 I arrange upon the piston rod 10 slidable spring plates 19 and 20 (Fig. 3) which normally abut against the ends 26 and 27 of an enlarged portion 25 of the piston rod, but which are also subject to the movement of two pairs of arms 17 and 18 carried by the block and embracing the portion 25. These arms lie normally in the same plane (as to their upper and lower faces respectively) as the upper and lower edges 26 and 27 of the enlargement 25 on the piston rod. This position of the block 12 with relation to the piston rod 10 may be conveniently termed the relative median position of the piston rod.

Coil springs 21 and 22 surrounding the piston rod abut at their inner ends against the spring plates 19 and 20 and at their outer ends against adjustable screw nuts 23 and 24 which also form the bearings for the piston rod and work within the walls of the chamber 40. These springs, it will be at once noted, serve to return the piston rod to its relative median position whenever it becomes displaced therefrom.

To enable the liquid brake to act in the desired manner, I provide the piston 47 with a small hole 29, which with the perforations 30 in the hollow piston rod, establishes communication between the oil spaces 28 and 31 of the brake cylinder 46. When the piston rod is in its relative median position the hole 29 in the piston is closed by the conical point 32 of a central pin 33 which extends upward axially through the hollow piston. Midway its length, this pin is provided with a traverse 36 which extends horizontally through vertical slits 49 (Fig. 2) in the piston rod and rests upon the arms 38 (Fig. 4) of a forked flap 37 hinged at 39 to the arms 18 upon the upper faces of which said flap 37 rests. Upon the piston rod 10 is formed a nose 48 the upper face of which, when the piston is in its relative median position, comes in contact with the lower surface of the flap 37 and thus through the traverse 36, affords means for lifting the pin 33. In connection with the pin is provided further a tube 35 incasing the same and resting on the traverse 36. When the piston is in its relative median position the weight 34 adjusted on the upper end of the pin 33 is supported by the tube 35. It is thus seen that when the piston is in relative median position the springs 21 and 22 are under equal tension, the arms of the block 12 and the enlargement 25 of the piston are in the same planes with respect to their upper and lower edges, the piece 37 lies flat on the arms 18, the pin 33 closes the hole 29 and the weight 34 is supported by the tube 35.

The mechanism described works in the following manner:—The lever 7 is in median position, for instance, the piston-rod 10 in relative median position, and the pin 44 is set to the right of the shaft middle 41 as shown in Fig. 3. The lever 7 is turned rapidly clockwise and then held fast. The pin 44 will move the block 12 a distance downward, while at the same time the pin 43 and the connecting rod 45 move the liquid brake 46 upward. The oil inclosed in the space 28 is thereby compressed and moves the piston 47 and the piston-rod 10 a like distance upward. The piston-rod 10 thus executes a relative movement upward with relation to the block 12 and by means of the upper edge 26 of the enlarged part 25 lifts the spring-plate 19 off from the arms 17. A like relative displacement in vertical direction takes place between the nose 48 and the hinge 39 of the flap 37 with the result that the flap 37 swings upward, so that its side pieces 38, by means of the parts 36, 35 and 34, lift the pin 33 in relation to the piston 47. The hole 29 is thereby opened, and in consequence of the super-pressure in the oil space 28 the oil escapes therefrom to the oil-space 31, whereby the piston 47, moves downward in the cylinder 46. But the hole 29 is so small that this movement during the quick turning of the lever 7 may be entirely neglected. It can be assumed that during the whole rapid upward movement of the cylinder 46 the piston-rod 10 is carried along in unison. Thereafter the spring 21 will seek to press the piston-rod 10 downward, and the oil will quite slowly escape from the space 28 through the hole 29. The downward movement will continue until the spring-plate again rests upon the arms 17 and the piston-rod 10 again occupies its relative median position. The nose 48 is again flush with the arms 18; the flap 37 flat upon the arms 18, and the pin 33 again completely closes the hole 29, so that the passage of oil is entirely stopped.

The absolute movement of the piston-rod 10 is to be noted. It was rapidly lifted and then slid slowly down to the relative median position with relation to the block 12. The latter had in the meantime gone a certain distance downward, and in consequence thereof the piston-rod 10 after the completion of its downward movement, finds itself in a lower position than before. All parts, as 12, 37, 36, 35, 34, 33, 10, 47, 19 and 20 are again in exactly the same relative position with regard to each other as before, but they have all been displaced downward a certain distance. If the lever 7 is rapidly turned a bit contra-clock-wise the process is a similar one, except that all the movements are reversed. The block 12 is moved upward, the oil-brake-cylinder 46 downward. In space 28 a slight vacuum is caused, and the piston 47 and the piston-rod 10 are drawn downward. The latter thus passes downward, relatively to the block 12, the spring-plate 20 being lifted off from the arms 18, and the spring 22 must exert an upward pressure on the piston-rod 10. The flap 37 remains lying immovable on the arms 18 and holds the parts 36, 35, 34 and the pin 33 firmly, while the piston 47, is drawn downward relatively thereto. The opening 29 opens again, and the oil quite slowly passes back from space 31 to 28. In consequence of the pressure of the spring 22 the piston-rod 10 moves slowly upward and comes to a rest only when it has attained the relative median position with relation to the block 12. The hole 29 is then closed again, and the parts 12, 37, 36, 35, 33, 10, 47, 19, 20 again occupy their original relative position with regard to each other; except that a displacement has taken place, so that the piston-rod 10, following the block 12, now comes to rest in a higher position than that occupied before the turning of the lever 7.

If this arrangement is so built into the regulator, Fig. 1, that the regulator valve motor 4 acts upon the lever 7 and the piston-rod 10 is connected with the fulcrum 51 of the regulator lever, the regulator possesses an entirely new quality. The process of regulation is then as follows: The regulator, we will say, is in its normal position and the regulated engine is working under about half its capacity. The regulator-lever 2 is in the position 50—51—52, and the piston-rod 10 is in its relative median position with regard to the block 12. Now we will suppose that a sudden discharge of the working load takes place. As the sleeve 52 of the centrifugal regulator rises to 52' carrying the lever 2 which is fulcrumed at 51, the other end 50 descends carrying with it the piston 60 of the valve 3. The power supply passage 61 is thereby opened and the pressure liquid flows through channel 62 into the upper cylinder space, while the liquid under the piston can run off through the channels 63 and 64. The piston 4 moves downward, the lever 5—55 reaches the position 5—55', and the power supply of the regulated engine is lessened. The lever 7 passes from the position 41—57 into the position 41—57' and, as above described, shifts the fulcrum 51 of the lever 2 to 51', the valve 60 being again led back into its median position. After the rapid regulation the regulating lever 2 takes the position 50—51' 52', and the speed of revolution, corresponding to the higher position of the sleeve, is also higher. In this regulation the piston-rod 10, as above described, is moved upward, the block 12 downward, and now the piston-rod 10 with the regulating lever 2 sinks down quite slowly out of position 50—51'—52' and presses the valve 60 downward. The result is that the piston of the valve motor moves a little further downward and consequently still further reduces the supply of power. The speed of revolution of the centrifugal regulator is thereby slowly decreased, and the regulator sleeve sinks correspondingly. This raises the valve-piston 60 somewhat and it is thus returned to its median position. The return mechanism and the centrifugal regulator have in a measure exchanged their functions, as the shifting of the fulcrum 51 initiates the regulator movement and returns the regulator sleeve. As a consequence thereof, the downward movement of the regulator sleeve lasts until the piston-rod 10 or in other words the fulcrum 51, descends. But according to the above description of the working of the contrivance the fulcrum 51 must descend even below its original position and come to rest only at 51''. Accordingly the regulator sleeve will also descend to 52'', which position, however, corresponds to a lesser speed of revolution than that reigning before the beginning of the regulation. If an additional load is imposed upon the working motor, all the movements of the regulator take place in reverse direction, and the mechanism comes to rest only at a higher number of revolutions than before. Thus the regulator secures also what I have termed the reverse degree of non-uniformity.

If the crank pin 44 is displaced to $44^a$, so that it lies in the same axis with the shaft 41, the block 12 remains constantly at rest, and after each variation the piston rod 10 always returns to the same absolute median position. The regulator lever 2 must therefore also after each regulation return to the median position 50—51—52, and the regulator will thus at every variation of load have the same speed of revolution. Finally, the bolt 44 can also be displaced to $44^b$, so that 43 and $44^b$ lie on the same radius, it being always assumed that the crank-radius of 43 is greater than that of $44^b$. On a quick turning of the lever 7 clockwise the stop block 12 now moves upward, as well as the piston-rod 10. But as the pin 43 has the greater crank-radius, the movement of 10 will be greater than that of 12. The piston-rod 10 will therefore, with regard to the stop 12, have a relative displacement upward. The spring plate 19 is lifted from the arms 17 and the small hole 29 in the piston 47 opened. Under the influence of the spring 21 a downward movement of the piston-rod 10 again takes place, until it has reached the relative median position. But as the block 12 was moved upward, the piston-rod, will come to rest in a higher position than before. The process of regulation takes place in exactly the same manner as above described. Suppose the regulator to be in its normal position and the regulator lever 2 occupies the position 50—51—52. On a sudden discharge of the load the piston-rod 10 will move exactly as before described. The regulator-lever, at the end of the rapid regulation, will take the position 50—51'—52' and will sink again with a slow decrease in the speed of revolution. But the block 12 was moved a bit upward and thus the piston-rod 10 will not be able to sink down to the former position. The fulcrum 51 will come to rest at 51''', and the regulator sleeve 52 will only be able to sink to 52'''. The regulator thus comes to rest in a higher position than that occupied by it before the beginning of the regulation, and the speed of revolution will also be correspondingly higher. In this case the regulator possesses what I have termed the normal degree of non-uniformity.

Through the horizontal adjustment of the pin 44 on the crank 42 any desired normal or reversed degree of non-uniformity can be secured. The return mechanism of the regulator may be thus varied as desired.

My invention may be carried out in various ways and I do not limit myself to the precise construction shown.

I claim as my invention:

1. In a regulator of the kind described, a regulator motor, a valve therefor, a centrifugal regulator in operative connection with said motor valve, in combination with a valve return mechanism comprising return rods connected with the regulator motor and the valve controlling means, an interposed liquid brake in connection with said valve return rods, a stop positively operated by one of said return rods, the liquid brake having one of its parts positively connected to the same return rod, and means to return the other part of said brake to the same relative median position in relation to said stop after each regulation.

2. In a regulator of the kind described, a regulator motor, a valve therefor, a centrifugal regulator in operative connection with said motor valve, in combination with a valve return mechanism comprising return rods connected with the regulator motor and the valve controlling means, an interposed liquid brake in connection with said valve return rods, a stop operated by one of said return rods, means to control the movement of the stop with relation to the return rods.

3. In a regulator of the kind described, a regulator motor, a valve therefor, a centrifugal regulator in operative connection with said motor valve, in combination with a valve return mechanism comprising return rods connected with the regulator motor and the valve controlling means, an interposed liquid brake in connection with said valve return rods, a block operated by one of said return rods, means to control the movement of the block with relation to the return rods, and means operated by said block for opening the passage in the liquid brake.

In testimony whereof I have signed my name to this specification, in the presence of two subscribing witnesses.

CARLOS SCHMITTHENNER.

Witnesses:
ERNEST ENTLEMANN,
HENRY H. MORGAN.